(12) United States Patent
Fahlenkamp et al.

(10) Patent No.: US 9,973,094 B2
(45) Date of Patent: May 15, 2018

(54) POWER CONVERTER AND POWER CONVERSION METHOD

(71) Applicant: Infineon Technologies Austria AG, Villach (AT)

(72) Inventors: Marc Fahlenkamp, Geretsried (DE); Martin Krueger, Oberschleissheim (DE)

(73) Assignee: INFINEON TECHNOLOGIES AUSTRIA AG, Villach (AT)

( * ) Notice: Subject to any disclaimer, the term of this patent is extended or adjusted under 35 U.S.C. 154(b) by 0 days. days.

(21) Appl. No.: 15/087,158

(22) Filed: Mar. 31, 2016

(65) Prior Publication Data

US 2017/0288553 A1    Oct. 5, 2017

(51) Int. Cl.
*H02M 3/335* (2006.01)
*H02M 1/08* (2006.01)
*H02M 1/00* (2006.01)

(52) U.S. Cl.
CPC ......... *H02M 3/33515* (2013.01); *H02M 1/08* (2013.01); *H02M 3/335* (2013.01); *H02M 2001/0009* (2013.01)

(58) Field of Classification Search
CPC ....... H02M 3/335761; H02M 3/33592; H02M 3/33538; H02M 3/33546; H02M 3/33515; H02M 3/33576; H02M 3/33507; H02M 3/335
See application file for complete search history.

(56) References Cited

U.S. PATENT DOCUMENTS

| | | | |
|---|---|---|---|
| 2013/0308791 A1* | 11/2013 | Yang | H04B 15/005 381/94.5 |
| 2014/0192565 A1* | 7/2014 | Wang | H02M 3/33592 363/21.14 |
| 2014/0252981 A1* | 9/2014 | Xie | H02M 3/33507 315/291 |
| 2017/0110981 A1* | 4/2017 | Deboy | H02M 7/217 |

* cited by examiner

*Primary Examiner* — Timothy J Dole
*Assistant Examiner* — Bryan R Perez
(74) *Attorney, Agent, or Firm* — Slater Matsil, LLP

(57) ABSTRACT

In accordance with an embodiment, a method includes disabling a first electronic switch connected in series with a primary winding of a transformer in a power converter circuit if an auxiliary voltage across an auxiliary winding of the transformer is outside a predefined voltage range. The power converter circuit further includes a secondary winding of the transformer, and a rectifier circuit connected between the secondary winding and an output, where the rectifier circuit comprises a second electronic switch.

28 Claims, 7 Drawing Sheets

POWER CONVERTER AND POWER CONVERSION METHOD

TECHNICAL FIELD

Examples of the present invention relate to a power converter, in particular a flyback converter, and a power conversion method.

BACKGROUND

Switched mode power converters (switched mode power supplies, SMPS) are widely used for power conversion in automotive, industrial, or consumer electronic applications. A flyback converter is a specific type of switched mode voltage converter which includes a transformer with a primary winding and a secondary winding that have opposite winding senses. A first electronic switch is connected in series with the primary winding on a primary side of the power converter, and a rectifier circuit is coupled to the secondary winding on a secondary side of the power converter. The transformer is magnetized when the electronic switch is closed and demagnetized when the electronic switch is opened. Magnetizing the transformer includes storing energy in the transformer, and demagnetizing the transformer includes transferring the stored energy to the secondary winding, the rectifier circuit and a load coupled to the rectifier circuit.

The rectifier circuit may include an active rectifier element, which is often referred to as synchronous rectifier (SR). This active rectifier element includes a second electronic switch which switches on when a voltage across the electronic switch has a first polarity and switches off when the voltage has a second polarity opposite the first polarity. The rectifier circuit may further include a capacitor. Switching on the first electronic on the primary side and the second electronic switch on the secondary side may cause the capacitor to be rapidly discharged, which is highly undesirable as this may damage the power converter.

SUMMARY

One example relates to a power converter circuit. The power converter circuit includes a transformer with a primary winding, a secondary winding, and an auxiliary winding, a first electronic switch connected in series with the primary winding, a rectifier circuit connected between the secondary winding and an output, and a first control circuit. The rectifier circuit includes a second electronic switch. The first control circuit is configured to evaluate an auxiliary voltage across the auxiliary winding and disable the first electronic switch if the auxiliary voltage is outside a predefined voltage range.

Another example relates to a method. The method includes disabling a first electronic switch connected in series with a primary winding of a transformer in a power converter circuit if an auxiliary voltage across an auxiliary winding of the transformer is outside a predefined voltage range. The power converter circuit further includes a secondary winding of the transformer, and a rectifier circuit connected between the secondary winding and an output, wherein the rectifier circuit comprises a second electronic switch.

BRIEF DESCRIPTION OF THE DRAWINGS

Examples are explained below with reference to the drawings. The drawings serve to illustrate certain principles, so that only aspects necessary for understanding these principles are illustrated. The drawings are not to scale. In the drawings the same reference characters denote like features.

DETAILED DESCRIPTION OF ILLUSTRATIVE EMBODIMENTS

In the following detailed description, reference is made to the accompanying drawings. The drawings form a part of the description and by way of illustration show specific examples in which the invention may be practiced. It is to be understood that the features of the various examples described herein may be combined with each other, unless specifically noted otherwise.

Figure 1:
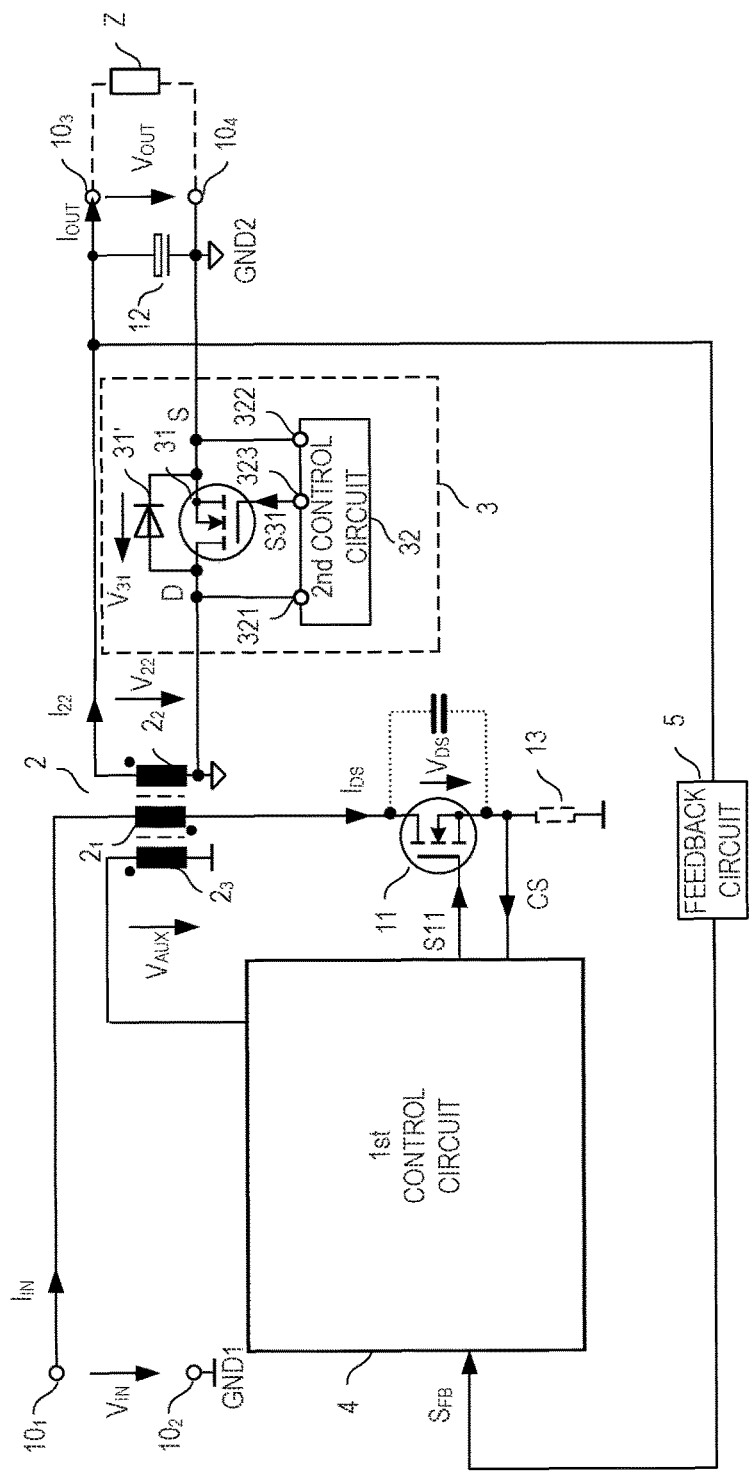
FIG. 1 shows a power converter circuit with a flyback topology according to one example.

FIG. 1 shows a power converter (switched mode power supply, SMPS) according to one example. The power converter shown in FIG. 1 has a flyback converter topology and is briefly referred to as flyback converter in the following. The flyback converter includes an input configured to receive an input voltage $V_{IN}$ and an input current $I_{IN}$ and an output configured to provide an output voltage $V_{OUT}$ and an output current $I_{OUT}$. The input may include a first input node $10_1$ and a second input node $10_2$, and the output may include a first output node $10_3$ and a second output node $10_4$. A load Z (illustrated in dashed lines in FIG. 1) may receive the output voltage $V_{OUT}$ and the output current $I_{OUT}$ available at the output. The flyback converter further includes a transformer 2 with a primary winding $2_1$ and a secondary winding $2_2$ magnetically coupled with the primary winding $2_1$. The primary winding $2_1$ and the secondary winding $2_2$ have opposite winding senses. A first electronic switch 11 is connected in series with the primary winding $2_1$ whereas the series circuit with the primary winding $2_1$ and the electronic switch 11 is connected between the first and second input nodes $10_1$, $10_2$ to receive the input voltage $V_{IN}$. The transformer 2 galvanically isolates the input $10_1$, $10_2$ from the output $10_3$, $10_4$ so that the input voltage $V_{IN}$ is referenced to a first ground node GND1, and the output voltage $V_{OUT}$ is referenced to a second ground node GND2.

The flyback converter 1 further includes a rectifier circuit connected between the secondary winding $2_2$ and the output $10_3$, $10_4$. In the example shown in FIG. 1, this rectifier circuit includes a series circuit with a capacitor 12 and an active rectifier circuit 3. This series circuit is connected in parallel with the secondary winding $2_2$. The output voltage $V_{OUT}$ is available across the capacitor 12, which is referred to as output capacitor in the following. The active rectifier circuit includes a second electronic switch 31 and a passive rectifier element 31', such as a diode, connected in parallel with the second electronic switch. According to one example, the second electronic switch 31 is a MOSFET, in particular an enhancement (normally-off) MOSFET. A MOSFET, such as the MOSFET 31 shown in FIG. 1, includes an internal diode (often referred to as body diode) between a drain node and a source node. This internal diode may serve as the passive rectifier element 31' so that no additional passive rectifier element is required when a MOSFET is used as the second electronic switch 31. The passive rectifier element 31' shown in FIG. 1 may represent a discrete passive rectifier element or a body diode of a MOSFET. It is even possible to use a MOSFET as the second electronic switch 31 and connect a passive rectifier element 31' additional to the body diode of the MOSFET in parallel with the MOSFET. For example, the passive rectifier element is a bipolar diode (as shown) or a Schottky diode.

The passive rectifier element 31' (and the MOSFET 31, respectively) is connected such that the rectifier element 31' in an off-state of the electronic switch 31 allows electrical power to be transferred unidirectionally from the secondary winding $2_2$ to the output capacitor 12, but not from the output capacitor 12 to the secondary winding $2_2$. In the example shown in FIG. 1, the second electronic switch 31 is an n-type MOSFET and is connected between the second output node $10_4$ and the secondary winding $2_2$; the second output node $10_4$ is the negative output node. In order for the body diode of the MOSFET 31 to allow a power transfer from the secondary winding $2_2$ to the output capacitor 12, the MOSFET 31 is connected such that its drain node D is coupled to the secondary winding $2_2$ and its source node S is coupled to the second output node $10_4$. The second electronic switch 31, however, is not restricted to be implemented using an n-type MOSFET. A p-type MOSFET, or another type of transistor may be used as well, such as an IGBT, a BJT (Bipolar Junction Transistor), a JFET (Junction Field Effect Transistor), or the like.

Referring to FIG. 1, the active rectifier circuit (which may also be referred to as synchronous rectifier circuit) includes a control circuit 32. At input nodes 321, 322 the control circuit 32 receives a voltage $V_{31}$ across the electronic switch 31 and the passive rectifier element 31', respectively. The control circuit 32 is configured to drive the electronic switch 31 based on this voltage $V_{31}$, in particular, based on a polarity of this voltage $V_{31}$. For driving the second electronic switch 31 the second control circuit provides a second drive signal S31 at a drive output 323, the second electronic switch 31 receives the drive signal S32 at a control node, which is a gate node if the second electronic switch 31 is a MOSFET. Driving the second electronic switch 31 based on the voltage $V_{31}$ is explained in greater detail herein below.

A further control circuit 4 is configured to drive the first electronic switch 11 based on a feedback signal $S_{FB}$ received from a feedback circuit 5 and an auxiliary voltage $V_{AUX}$ received from an auxiliary winding $2_3$ of the transformer 2. In the following, the control circuit 4 that drives the first electronic switch 11 is referred to as a primary side control circuit or first control circuit, and the control circuit 32 that drives the second electronic switch 31 is referred to as a secondary side control circuit or second control circuit. The first control circuit 4 is configured to operate the first electronic switch 11 in a pulse-width modulated (PWM) fashion, as explained in further detail herein further below.

According to one example, the first electronic switch 11 is a transistor. In the example shown in FIG. 1, the transistor is a MOSFET (Metal Oxide Semiconductor Field-Effect Transistor), in particular an n-type enhancement MOSFET. However, this is only an example. Other types of transistors, such as an IGBT (Insulated Gate Bipolar Transistor), a JFET (Junction Field-Effect Transistor), a BJT (Bipolar Junction Transistor), or p-type MOSFET may be used as well.

Figure 2:
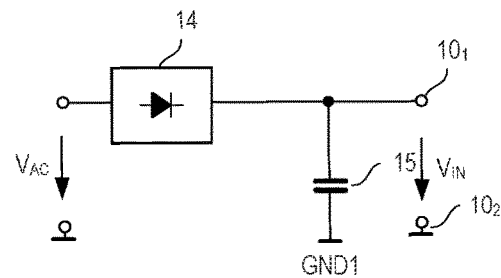
FIG. 2 shows one example of how an input voltage of the power converter shown in FIG. 1 can be generated.

According to one example, the input voltage $V_{IN}$ is a direct voltage (DC voltage). Referring to FIG. 2, this input voltage $V_{IN}$ can be generated from an alternating voltage (AC voltage) $V_{AC}$ by a rectifier circuit 14, such as a bridge rectifier with passive or active rectifier elements. A further capacitor 15, which is referred to as input capacitor in the following, may be connected between the input nodes $10_1$, $10_2$ to filter out ripples of the input voltage $V_{IN}$.

Figure 3:
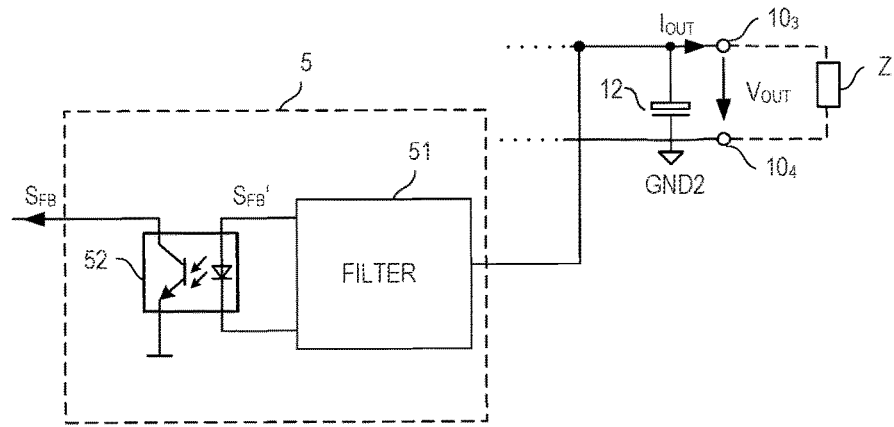
FIG. 3 shows one example of a feedback circuit in the power converter circuit shown in FIG. 1.

FIG. 3 shows one example of the feedback circuit 5, which generates the feedback signal $S_{FB}$. The feedback circuit may include a filter 51 that receives the output voltage $V_{OUT}$, and a transmitter 52. In the example shown in FIG. 3, the filter 51 is on the secondary side of the transformer 2, and the transmitter 52 transmits an output signal $S_{FB}'$ of the filter 51 from the secondary side to the primary side, whereas an output signal of the transmitter 52 is the feedback signal $S_{FB}$ received by the control circuit 4. The "primary side" of the power converter is formed by the primary winding $2_1$ and circuitry connected to the primary winding $2_1$, and the "secondary side" of the power converter is formed by the secondary winding $2_2$ and circuitry connected to the secondary winding $2_2$. In the example shown in FIG. 3, the transmitter 52 includes an optocoupler. However, this is only an example. Other transmitters suitable to transmit a signal via a potential barrier provided by a transformer may be used as well. Examples of such transmitter include a transmitter with a transformer, such as a coreless transformer. The filter 51 is configured to generate an error signal from the output voltage $V_{OUT}$ and a reference signal, and generate the feedback signal $S_{FB}$ based on the error signal. This is explained with reference to FIG. 4 below.

Figure 4:
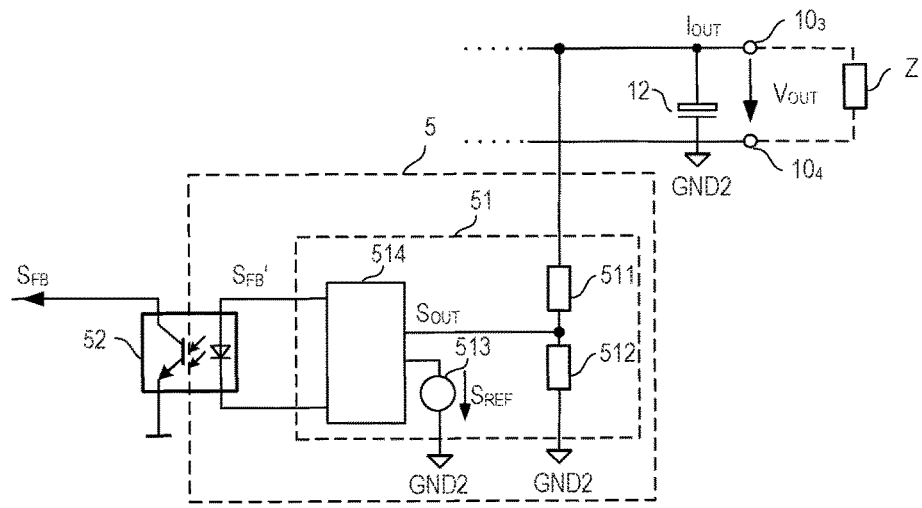
FIG. 4 shows one example of a filter circuit shown in FIG. 3 in greater detail.

FIG. 4 shows one example of the filter 51 in greater detail. In this example, the filter includes an error filter 514 which receives a reference voltage $S_{REF}$ from a reference voltage source 513 and either the output voltage $V_{OUT}$ or a signal $S_{OUT}$ proportional to the output voltage $V_{OUT}$. In the example shown in FIG. 4, the error filter receives a signal $S_{OUT}$ proportional to the output voltage from a voltage divider 511, 512 connected between the output nodes $10_3$, $10_3$. The error filter is configured to calculate a difference between the signal $S_{OUT}$ representing the output voltage $V_{OUT}$ and the reference signal $S_{REF}$, and filter this difference in order to generate the filter output signal $S_{FB}'$. According to one example, the error filter 514 has one of a proportional (P) characteristic, a proportional-integral (PI) characteristic, and a proportional-integral, derivative (PID) characteristic. The transmitter 52 does not change the characteristic of the error filter 514 output signal $S_{FB}'$. In particular, the feedback signal $S_{FB}$ output by the transmitter 52 to the first control circuit 4 can be substantially proportional to error filter 514 output signal $S_{FB}'$. Thus, in the following, the term "feedback signal" will be used for both, the signal output by the error filter 514 and the signal received by the first control circuit 4, although these signals are referenced to different ground potentials. The feedback signal $S_{FB}'$ output by the error filter 514 is referenced to the secondary side ground node GND2, while the feedback signal $S_{FB}$ output by the transmitter circuit 52 and received by the first control circuit 4 is referenced to the primary side ground node GND1.

The reference signal $S_{REF}$ defines a desired value (set value) of the output voltage. For example, if d is the divider ratio of the voltage divider 511, 512 so that $S_{OUT}=d \cdot V_{OUT}$, then the set value of the output voltage $V_{OUT}$ is given by $S_{REF}/d$.

According to another example (not shown), the positions of the filter 51 and the transmitter 52 in the feedback circuit 5 are changed so that the transmitter transmits a signal representing the output voltage $V_{OUT}$ from the secondary side to the primary side and a filter receives the signal transmitted by the transmitter and generates the feedback signal $S_{FB}$.

Figure 5:
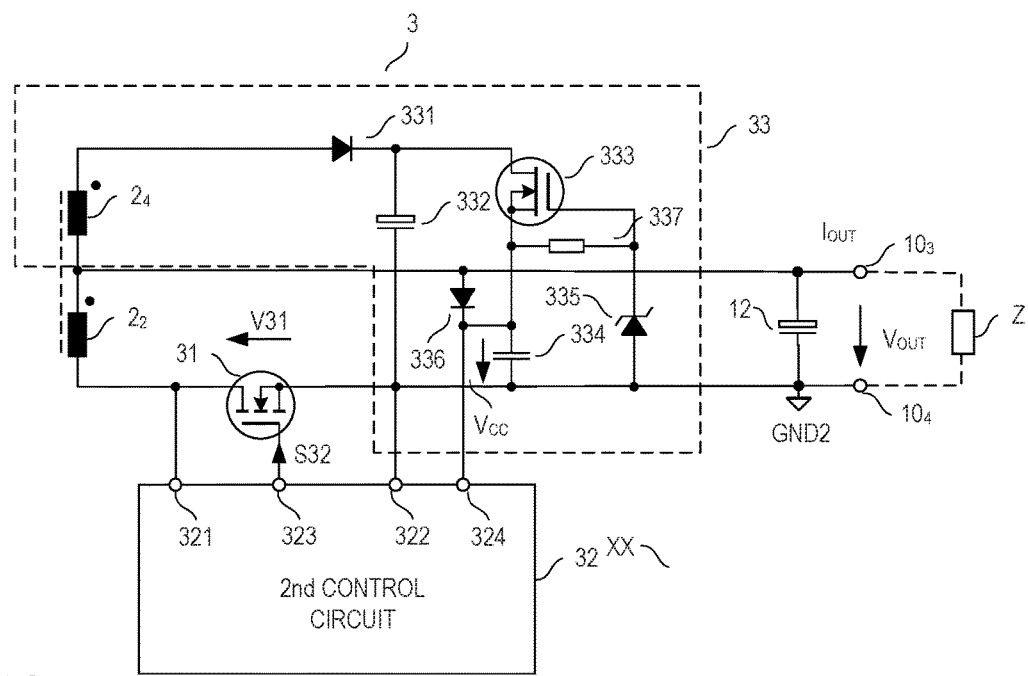
FIG. 5 shows one example of a rectifier circuit in the power converter circuit shown in FIG. 1.

FIG. 5 shows another example of the active rectifier 3 circuit. In this example, the active rectifier circuit 3 includes an auxiliary power supply 33 configured to generate a supply voltage $V_{CC}$ received by the second control circuit 32. The power supply includes a further auxiliary winding $2_4$ inductively coupled with the primary winding $2_1$ and the secondary winding of the transformer 2. In the following, the auxiliary winding $2_3$ coupled to the first control circuit 4 and shown in FIG. 1 is referred to as first auxiliary winding and the auxiliary winding $2_3$ of the auxiliary power supply 33 is referred to as second auxiliary winding. According to one example, the second auxiliary winding $2_4$ and the secondary winding $2_2$ have the same winding sense so that the auxiliary winding $2_4$ receives power from the primary winding in the same way as the secondary winding $2_2$. Details of this power transfer are explained with reference to FIG. 6 below.

Referring to FIG. 5, the auxiliary power supply 33 further includes a rectifier circuit with a rectifier element 331, such as a diode, and a first capacitor 332. In the example shown, a first circuit node of the auxiliary winding $2_4$ is connected to the first output node $10_3$ and a series circuit with the rectifier element 331 and the capacitor 332 is connected between a second circuit node of the auxiliary winding $2_4$ and the second output node $10_4$. The supply voltage $V_{CC}$ is available across a second capacitor 344, which is connected to a supply input 324 of the second control circuit 32. This second capacitor 334 is referred to as output capacitor of the auxiliary power supply 33 in the following. A voltage regulator is connected between the first capacitor 332 and the output capacitor 334. This voltage regulator can be implemented as a linear voltage regulator as shown in FIG. 5. In this case, a transistor 333 such as a MOSFET has its load path (drain-source path) connected between the first capacitor 332 and the output capacitor 334 and is driven dependent on the supply voltage $V_{CC}$ such that the transistor 333 blocks each time the supply voltage $V_{CC}$ rises above a predefined threshold. The Zener diode 335 therefore clamps the electrical potential at the gate node of the transistor 333 to a value given by the Zener voltage of the Zener diode 335. For this, a voltage limiting element, such as a Zener diode 335 is connected between a gate node of the transistor 333 and that circuit node of the output capacitor 334 that faces away from the load path of the transistor 333. A resistor 337 connected between the output capacitor 334 and the Zener diode 335 biases the Zener diode, that is, via the resistor 337 the Zener diode 335 receives a current required by the Zener diode 335 to clamp the electrical potential at the gate node of the transistor 333. According to one example, the transistor 333 is a depletion transistor such as a depletion MOSFET. Optionally, the output capacitor 334 is further coupled to the first output node $10_3$ via a rectifier element 336, such as a diode, so as to receive the output voltage $V_{OUT}$. In this way the control circuit 32 is supplied by both the auxiliary power source 33 and the output $10_3$, $10_4$ of the power converter.

Figure 6:
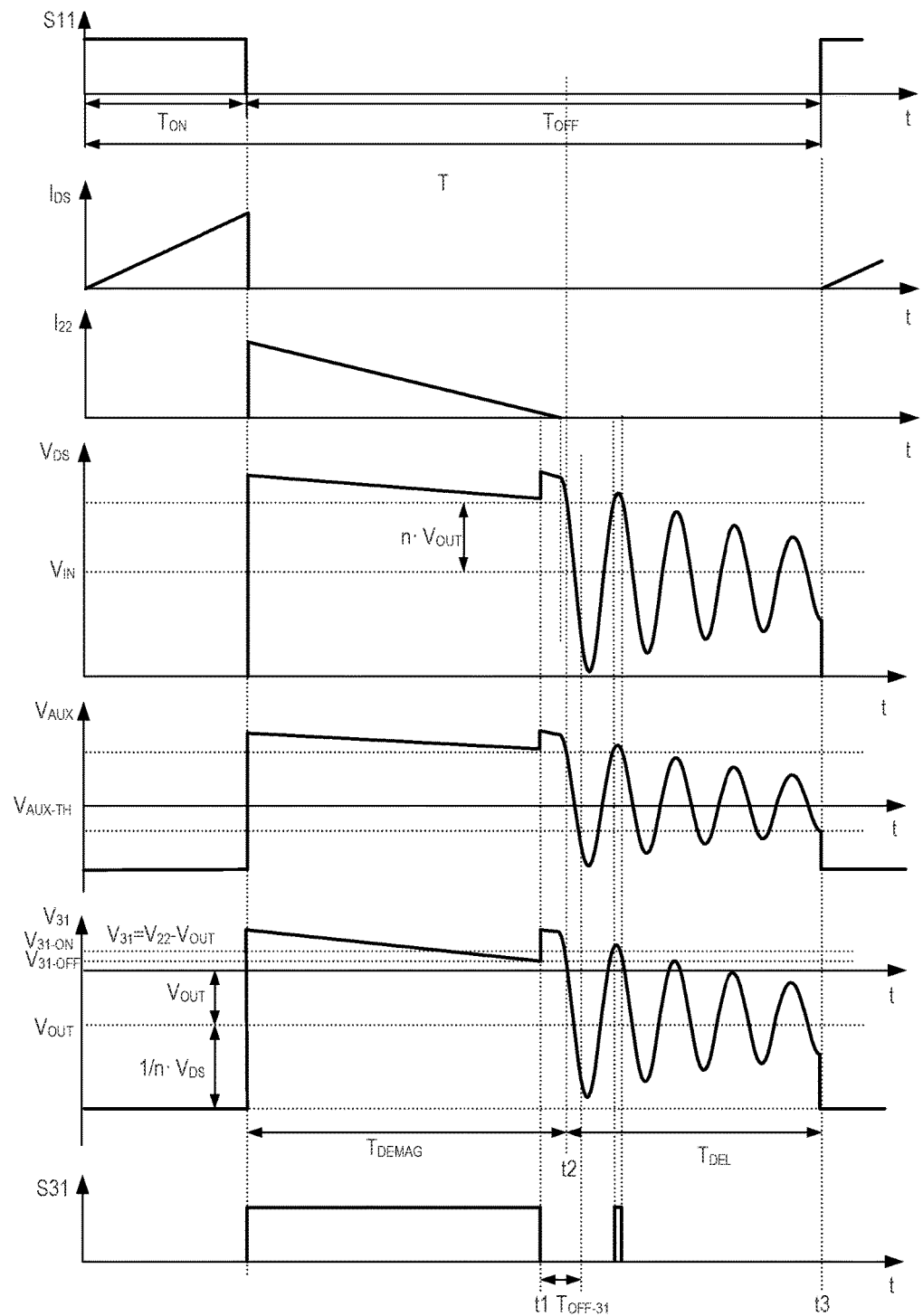
FIG. 6 shows signal diagrams which illustrate operation of the power converter circuit.

One way of operating the flyback converter is explained with reference to FIG. 6 below. FIG. 6 shows timing diagrams of a first drive signal S11 of the first electronic switch 11, a current $I_{DS}$ through the primary winding $2_1$, a current $I_{22}$ through the secondary winding $2_2$, a load path voltage $V_{DS}$ across a load path of the first electronic switch 11, an auxiliary voltage $V_{AUX}$ across the first auxiliary winding $2_3$ of the transformer, the voltage $V_{31}$ across the second electronic switch 31 in the active rectifier circuit 3, and the second drive signal S31 of the second electronic switch 31. In the MOSFET forming the first electronic switch 11 shown in FIG. 1, the load path voltage $V_{DS}$ is the drain-source voltage, and the load current $I_{DS}$ is the drain-source current. The first drive signal S11 is generated by the first control circuit 4 and is received by a gate node of the MOSFET 11. The drive signal S11 may have one of a first signal level that switches on the electronic switch 11, and a second signal level that switches off the electronic switch 11. The first level is referred to as on-level and the second signal level is referred to as off-level in the following. Just for the purpose of explanation, in the example shown in FIG. 6, the on-level of the drive signal S11 is drawn as a high signal level and the off-level is drawn as a low level.

Operating the flyback converter includes a plurality of successive drive cycles, wherein in FIG. 6 only one of these drive cycles is shown. In each drive cycle the control circuit 4 switches on the first electronic switch 11 for an on-period $T_{ON}$ and, after the on-period $T_{ON}$, switches off the first electronic switch 11 for an off-period $T_{OFF}$. During the on-period $T_{ON}$, the input voltage $V_{IN}$ causes the load current $I_{DS}$ to flow through the primary winding $2_1$ and the first electronic switch 11, whereas a current level of the load current $I_{DS}$ increases during the on-period $T_{ON}$. This increasing load current $I_{DS}$ is associated with an increasing magnetization of the transformer 2. Such magnetization is associated with magnetically storing energy in the transformer 2 (more precisely, in an air gap of the transformer 2), whereas the stored energy increases as the load current $I_{DS}$ increases. During the on-period $T_{ON}$, the load path voltage $V_{DS}$ of the electronic switch 11 is substantially zero (if an ohmic resistance of the first electronic switch 11 in the on-state is neglected), and a voltage across the primary winding $2_1$ substantially equals the input voltage $V_{IN}$. In the example shown in FIG. 1, the first auxiliary winding $2_3$ and the primary winding $2_1$ have opposite winding senses. In this case, a voltage level of the auxiliary voltage $V_{AUX}$ is given by $$V_{AUX}=-(N_{AUX}/N_{21}) \cdot V_{21} \tag{1a}$$

where $N_{AUX}$ is the number of windings of the first auxiliary winding $2_3$, $N_{21}$ is the number of windings of the primary winding $2_1$, and $V_{21}$ is the voltage across the primary winding. Thus, during the on-period $T_{ON}$, the voltage level of the auxiliary voltage $V_{AUX}$ is given by $$V_{AUX}=-(N_{AUX}/N_{21}) \cdot V_{IN} \tag{1b}$$

When the first electronic switch 11 switches off, the energy stored in the transformer 2 is transferred to the secondary winding $2_2$, the rectifier circuit with the output capacitor 12 and the active rectifier 3, and the load Z, respectively. This causes the transformer 2 to be demagnetized. In FIG. 6, $T_{DEMAG}$ denotes a time period in which the transformer 2 is demagnetized, that is, in which energy is transferred to the secondary side of the transformer 2. In this time period $T_{DEMAG}$, which is also referred to as demagnetizing period in the following, the load path voltage $V_{DS}$ substantially equals the input voltage $V_{IN}$ plus a reflected voltage $V_{REFLECT}$. The reflected voltage $V_{REFLECT}$ is substantially given by $$V_{REFLECT} = n \cdot (V_{OUT} + V_{31}) = N_1/N_2 \cdot (V_{OUT} + V_{31}) \quad (2),$$

where n is a winding ratio of transformer, which is given by $n=N_1/N_2$, with $N_1$ being the number of windings of the primary winding $2_1$, and $N_2$ being the number of windings of the secondary winding $2_2$. $V_{31}$ is the voltage across the second electronic switch 31 in the active rectifier 3. This voltage $V_{31}$ across the second electronic switch 31 is dependent on a current level of a current $I_{22}$ through the secondary winding $2_2$. This current $I_{22}$ decreases over the demagnetizing period $T_{DEMAG}$, so that the reflected voltage $V_{REFLECT}$ decreases and, at the end of the demagnetizing period $T_{DEMAG}$, reaches $n \cdot V_{OUT}$.

Referring to FIG. 6, the drive signal S31 generated by the second control circuit 32 and driving the second electronic switch 31 may have one of a first signal level that switches on the second electronic switch 31, and a second signal level that switches off the second electronic switch 31. The first level is referred to as on-level and the second signal level is referred to as off-level in the following. Just for the purpose of explanation, in the example shown in FIG. 6, the on-level of the second drive signal S31 is drawn as a high signal level and the off-level is drawn as a low level. According to one example, the second control circuit 32 is configured to switch on the second electronic switch 31 when the voltage across the second electronic switch has a predefined polarity and when an absolute value of this voltage $V_{31}$ rises above a predefined first threshold $V_{31\text{-}ON}$, and switch off the second electronic switch 31 when the absolute value of this voltage $V_{31}$ falls below a predefined second threshold $V_{31\text{-}OFF}$. In the following, the first threshold $V_{31\text{-}ON}$ is referred to as on-threshold and the second threshold $V_{31\text{-}OFF}$ is referred to as off-threshold. According to one example, the on-threshold and the off-threshold are equal. According to another example, the on-threshold is higher than the off-threshold. This causes a hysteresis in the switching characteristic and may help to prevent the second electronic switch 31 from frequently switching on and off when the voltage $V_{31}$ is in the range of the on-threshold $V_{31\text{-}ON}$.

The predefined polarity of the voltage $V_{31}$ at which the second electronic switch 31 is allowed to switch on is a polarity that forward biases the passive rectifier element 31', that is, is a polarity that occurs across the second electronic switch 31 when power is transferred from the secondary winding $2_2$ to the output capacitor 12 and the load Z, respectively. Just for the purpose of illustration, in the figures the voltage $V_{31}$ is drawn such that it forward biases the passive rectifier element 31' when it is positive. Switching on the second electronic switch 31 when the passive rectifier element 31' is forward biased causes the current $I_{22}$ at least partially to bypass the passive rectifier element 31' and flow through the second electronic switch 31. By this, conduction losses can be reduced as compared to a power converter that only includes a passive rectifier element instead of the active rectifier 3.

Referring to FIG. 6, the voltage $V_{31}$ across the second electronic switch 31 has the predefined polarity (turns positive) and its absolute value rises above the on-threshold $V_{31\text{-}ON}$ at the beginning of the demagnetization period $T_{DEMAG}$, so that the second control circuit 32 switches on the second electronic switch 32. This is illustrated in FIG. 6 by the second drive signal S31 changing to the on-level. In the on-state of the second electronic switch 32 (that is, when the second electronic switch 32 has been switched on) the absolute value of the voltage $V_{31}$ across the second electronic switch is substantially given by an on-resistance of the second electronic switch 31 multiplied by the current $I_{22}$. As, referring to the explanation above, the current $I_{22}$ decreases over the demagnetization period $T_{DEMAG}$, the absolute value of the voltage $V_{31}$ decreases over the demagnetization period $T_{DEMAG}$. The "on-resistance" is the ohmic resistance of the second electronic switch 32 in the on-state. This on-resistance is mainly dependent on the specific type and design of the second electronic switch 32.

In FIG. 6, t1 denotes a time at which the absolute value of the voltage $V_{31}$ falls below the off-threshold $V_{31\text{-}OFF}$ so that the second control circuit 32 switches off the second electronic switch 31 (the second drive signal S31 changes to the off-level). In the example shown in FIG. 6, the off-threshold $V_{31\text{-}OFF}$ is different from zero, so that the first electronic switch 31 switches off before the voltage $V_{31}$ has decreased to zero, that is, before the transformer 2 has been demagnetized and the secondary side current $I_{22}$ has decreased to zero. The secondary side current $I_{22}$ then flows through the passive rectifier element 31' (which can be the body diode of the MOSFET 31 shown in FIGS. 1 and 5) until the transformer 2 has been demagnetized and the secondary side current $I_{22}$ has decreased to zero. Redirecting the secondary side current $I_{22}$ from the second electronic switch 31 to the passive rectifier element 31' causes the voltage $V_{31}$ across the parallel circuit with the first electronic switch 31 and the passive rectifier element 31' to increase to at least the forward voltage of the passive rectifier element 31'. Thus, as shown in FIG. 6, the voltage $V_{31}$ jumps to at least the forward voltage of the passive rectifier element 31' when the first electronic switch 31 switches off. At the end of the demagnetization period $T_{DEMAG}$, the voltage $V_{31}$ finally turns zero.

When the first electronic switch 31 switches off and the voltage $V_{31}$ jumps up the voltage $V_{31}$ may rise above the on-threshold $V_{31\text{-}ON}$. In order to prevent the first electronic switch 31 from again switching on towards the end of the demagnetization period $T_{DEMAG}$, the second control circuit 32, according to one example, is configured to keep the second electronic switch 31 switched off for a minimum off-period $T_{31\text{-}OFF}$ after the first electronic switch 31 has been switched off. During this minimum off-period the secondary side current $I_{22}$ and, therefore, the voltage $V_{31}$ decreases to zero.

FIG. 6 illustrates an operation of the power converter circuit in a discontinuous conduction mode (DCM). In this operation mode, there is a waiting time $T_{DEL}$ between a time t2 when the transformer 2 has been completely demagnetized and a time t3 when a next drive cycle starts by again switching on the first electronic switch 11. During the waiting time $T_{DEL}$ the voltage $V_{21}$ across the primary winding $2_1$ and the load path voltage $V_{DS}$ of the first electronic switch 11 oscillate. This is due to a parasitic resonant circuit that includes the primary winding $2_1$ of the transformer and a parasitic capacitance of the first electronic switch 11. This parasitic capacitance may include a capacitance in parallel with the load path of the first electronic switch 11. In the example shown in FIG. 1 this parasitic capacitance is drawn (in dotted lines) as a capacitor connected in parallel with the load path of the first electronic switch 11. By virtue of the magnetic coupling between the primary winding $2_1$, the secondary winding $2_2$, and the first auxiliary winding $2_3$ the auxiliary voltage $V_{AUX}$, and the voltage $V_{22}$ across the secondary winding $2_2$ oscillate in accordance with the load path voltage $V_{DS}$. The voltage $V_{31}$ across the second electronic switch 31 is given by the voltage $V_{22}$ across the secondary winding $2_2$ minus the output voltage $V_{OUT}$ ($V_{31}=V_{22}-V_{OUT}$) so that, during the waiting time $T_{DEL}$, the voltage $V_{31}$ across the second electronic switch 31 substantially oscillates around a voltage level given by the output voltage $V_{OUT}$.

In the DCM the power converter circuit can be operated in a fixed frequency mode or a variable frequency mode. In the fixed frequency mode, the first control circuit 4 switches on the first electronic switch 11 at a substantially fixed switching frequency. The switching frequency is the reciprocal of the duration T of one drive cycle, so that the durations T of the drive cycles are constant in the fixed frequency mode. In the variable frequency mode the durations T of the drive cycles and, therefore, the switching frequency may vary. According to one example, in each of the fixed frequency mode and the variable frequency mode a duration $T_{ON}$ of the on-period of the first electronic switch 11 is adjusted by the first control circuit 4 based on the feedback signal $S_{FB}$, which represents a power consumption of the load Z, that is, an output power of the power converter supplied to the load Z. When the power consumption of the load Z increases, a duration of the on-period $T_{ON}$ increases so as to increase an input power of the power converter to satisfy the power consumption of the load; when the power consumption of the load Z decreases, the duration of the on-period $T_{ON}$ decreases so as to decrease an input power of the power converter to satisfy the power consumption of the load.

One example of operating the power converter in the variable frequency mode is the quasi-resonant (QR) mode or valley mode, respectively. Referring to FIG. 6, the load path voltage $V_{DS}$ after the demagnetization period periodically includes local minima or valleys. The first control circuit 4 is configured to detect those local minima and, in the QR mode, is configured to switch on the first electronic switch 11 at the time of one of these local minima. This is shown in FIG. 6, where the signal diagrams are based on an example where the control circuit 4 switches on the first electronic switch 11 at a time at which a fifth local minimum (valley) after the demagnetization period $T_{DEMAG}$ occurs. In the QR mode, besides varying the on-period $T_{ON}$ to vary the input power the first control circuit 4 may further vary the number of valleys that are allowed to pass before the electronic switch 11 switches on. Thus, switching on in the fifth valley, as shown in FIG. 6, is just an example. The number of valleys that are allowed to pass (four in the example shown in FIG. 6) before the first electronic switch 11 again switches on define the waiting time between the end of the demagnetization period $T_{DEMAG}$ and the time of switching on the first electronic switch 11. This waiting period may vary dependent on the feedback signal $S_{FB}$.

Figure 7:
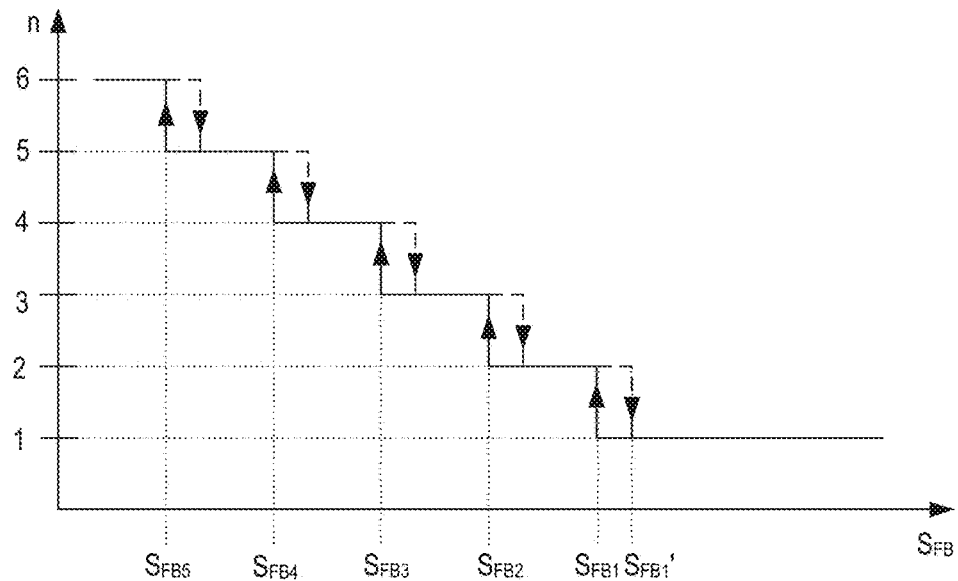
FIG. 7 illustrates one example of a relationship between a feedback signal and a number of oscillation periods during a waiting time in a quasi-resonant (QR) mode of a power converter.

One example of varying the number of valleys that are allowed to pass based on the feedback signal is illustrated in FIG. 7, which shows the number n of the valley in which the electronic switch 11 switches on dependent on the feedback signal. In this example, n=1 means that the electronic switch switches on in the first valley after the transformer has been demagnetized. In this case, there are no oscillations of the load path voltage $V_{DS}$ or, more precisely, there is substantially one half of one oscillation cycle of the load path voltage. If the feedback signal $S_{FB}$ falls below a first threshold $S_{FB1}$ the control circuit 4 starts to increase the waiting time, that is allows one valley to pass and switches on in the second valley. In FIG. 7 this is illustrated by n changing to n=2 at $S_{FB}=S_{FB1}$. If the feedback signal further decreases to a next threshold $S_{FB2}$ the control circuit further increases the waiting time by allowing a further valley to pass before the electronic switch 11 switches on, and so on. Increasing the waiting time without increasing the on-period $T_{ON}$ may result in a decreasing input power and. At a given power consumption of the load Z, a decreasing input power may result in a decreasing output voltage $V_{OUT}$ and, therefore, an increasing feedback signal. Thus, after increasing the waiting time by increasing n the feedback signal may rise. In order to prevent the control circuit 4 from frequently switching between two different values of n the characteristic curve shown in FIG. 7, that maps values of the feedback signal $S_{FB}$ to values of n, may include a hysteresis. By virtue of the hysteresis the control circuit 4 increases n if the feedback signal falls below a first threshold, $S_{FB1}$ for example, but decreases n not until the feedback signal $S_{FB}$ rises above another threshold, $S_{FB1'}$ for example, higher than the threshold $S_{FB}$.

The oscillation frequency of the parasitic oscillations during the waiting time is substantially fixed and given by the specific type and design of those devices that cause the oscillations. According to one example, the control circuit 4 is configured to detect the valleys based on detecting those times when the auxiliary voltage $V_{AUX}$ crosses zero in a certain direction (from positive to negative in the example shown in FIG. 6). A valley occurs substantially one quarter of one oscillation period after the zero crossing. The duration of one quarter of one oscillation period can be obtained by the first control circuit 4 by measuring the time distance between two subsequent zero crossings of the auxiliary voltage $V_{AUX}$ and dividing the result by 2.

Referring the above, the voltage $V_{31}$ across the second electronic switch 31 is given by the voltage $V_{22}$ across the secondary winding $2_2$ minus the output voltage $V_{OUT}$, so that after the demagnetization period $T_{DEMAG}$, the voltage $V_{31}$ oscillates around the output voltage $V_{OUT}$. The amplitude of those oscillations decreases over the waiting time. In the beginning, that is, right after the transformer 2 has been demagnetized the amplitude is substantially given by $1/n \cdot V_{DS}$, where n is the winding ratio of the transformer 2. For example, a rate at which the amplitude of the oscillations decreases is dependent on parasitic capacitances of the first electronic switch 11 and the second electronic switch 31, respectively.

In particular if the output voltage $V_{OUT}$ is low the voltage $V_{31}$ may cross the on-threshold $V_{31\text{-}ON}$ in one or more of the oscillation periods occurring during the waiting time $T_{DEL}$. In the example shown in FIG. 6, the voltage $V_{31}$ crosses the on-threshold $V_{31\text{-}ON}$ in one of these oscillation periods, so that the first electronic switch 31 is switched on by the second drive signal S31 until the voltage $V_{31}$ falls below the off-threshold $V_{31\text{-}OFF}$. For example, a low voltage level of the output voltage $V_{OUT}$, which may cause the voltage $V_{31}$ to reach the on-threshold $V_{31\text{-}ON}$ during the waiting time $T_{DEL}$, may occur during a start-up phase of the power converter or when a power consumption of the low Z rapidly increases or becomes higher than a rated output power of the power converter.

If the first electronic switch 11 switches on when the second electronic switch 31 during the waiting time $T_{DEL}$ is in the on-state, the output capacitor 12 is rapidly discharged via the conducting second electronic switch 31. This may cause the power converter to be severely damaged or even destroyed. Thus, it is undesirable for the first electronic switch 11 and the second electronic switch 31 to be switched on at the same time. When the power converter circuit operates in the QR mode, there is almost no risk of the first electronic switch 11 and the second electronic switch 31 being switched on at the same time. Referring to FIG. 6, the voltage $V_{31}$ across the second electronic switch 31 can reach the on-threshold $V_{31-ON}$ only during certain half-periods on the oscillation periods, with these certain half-periods being those half-periods, when the voltage $V_{31}$ reaches local maxima in the example shown in FIG. 6. During those half-periods, the voltage $V_{DS}$ across the first electronic switch 11 also reaches local maxima, so that those half-periods are different from those half-periods in which local minima of the voltage $V_{DS}$ occur and in which the first electronic switch 11 is switched on in the QR mode.

In the fixed frequency mode, however, switching on the first electronic switch 11 is independent of a detection of local minima of the voltage $V_{DS}$, so that in the fixed frequency mode a time when the first electronic switch 11 switches on may fall into a time period when the second electronic switch 31 is on the on-state because the voltage $V_{31}$ has reached the on-threshold $V_{31-ON}$.

Referring to FIG. 6, time periods when the voltage $V_{31}$ across the second electronic switch 31 is above the on-threshold $V_{31-ON}$ lie within time periods in which the auxiliary voltage $V_{AUX}$ is outside a predefined voltage range defined by a threshold voltage $V_{AUX-TH}$. For example, as shown in FIG. 6, the threshold voltage $V_{AUX-TH}$ is zero and the auxiliary voltage $V_{AUX}$ is outside the predefined voltage range defined by the threshold voltage $V_{AUX-TH}$ if the auxiliary voltage is above the threshold voltage $V_{AUX}$.

According to one example, the control circuit 4 is configured to monitor the auxiliary voltage $V_{AUX}$ and disable the first electronic switch 11 if the auxiliary voltage $V_{AUX}$ is outside the predefined voltage range defined by the threshold voltage $V_{AUX-TH}$. "To disable the first electronic switch if the auxiliary voltage $V_{AUX}$ is outside the predefined voltage range" means to prevent the first electronic switch 11 from switching on as long as the auxiliary voltage $V_{AUX}$ is outside the predefined voltage range.

Figure 8:
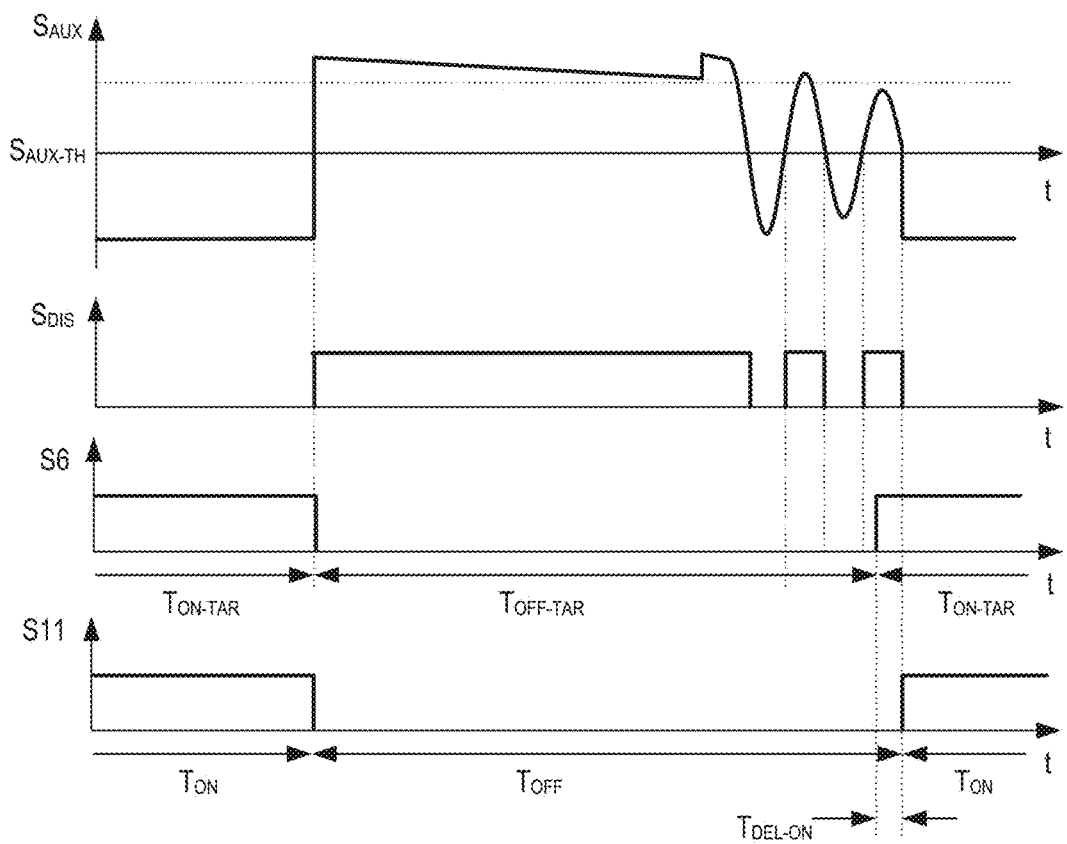
FIG. 8 shows signal diagrams which illustrate one way of operation of a first control circuit in the power converter circuit.

One example of disabling the first electronic switch 11 based on the auxiliary voltage $V_{AUX}$ is explained with reference to FIG. 8, which shows timing diagrams of an auxiliary signal $S_{AUX}$, a disable signal $S_{DIS}$, a targeted drive signal S6, and the drive signal S11 received by the first electronic switch 11. For example, the auxiliary signal $S_{AUX}$ is either the auxiliary voltage $V_{AUX}$ or a signal proportional to the auxiliary voltage $V_{AUX}$. The disable signal $S_{DIS}$ can be obtained by comparing the auxiliary signal $S_{AUX}$ with a threshold signal $S_{AUX-TH}$ that represents the threshold voltage explained above. According to one example, the threshold signal $S_{AUX-TH}$ is zero. The disable signal $S_{DIS}$ can have two different signal levels, a first signal level that disables the first electronic switch 11, and a second signal level that does not disable (but enables) the first electronic switch 11. The first level is also revered to as disable level and the second level is also referred to as enable level in the following. Just for the purpose of illustration, the disable level is a high level and the enable level is a low level in the example shown in FIG. 8. Referring to FIG. 8, the disable signal $S_{DIS}$ has the disable level each time the auxiliary signal $S_{AUX}$ is outside the predefined signal range defined by the threshold signal $S_{AUX-TH}$. In this example, the auxiliary signal $S_{AUX}$ is outside the signal range if the auxiliary signal $S_{AUX}$ is above the threshold $S_{AUX-TH}$.

The signal diagrams shown in FIG. 8 illustrate operating the power converter circuit in a fixed frequency mode. In this operation mode, the first control circuit 4 defines a plurality of successive targeted drive cycles of the first electronic switch 11. Each of these targeted drive cycles includes an on-period $T_{ON-TAR}$ and an off-period $T_{OFF-TAR}$. In the fixed operation mode, the control circuit 4 adjusts a duration of the on-periods $T_{ON-TAR}$ of the targeted drive cycles based on the feedback signal $S_{FB}$, and generates the on-periods $T_{ON-TAR}$ at a fixed frequency. In this context, a "fixed frequency" is a frequency defined by an oscillator and independent of a magnetization state of the transformer 2. In particular, "fixed frequency" means that a duration of one drive cycle is predefined. Nevertheless, the control circuit 4 can be configured to adjust the fixed frequency dependent on the feedback signal $S_{FB}$. This is explained in further detail herein further below.

In the fixed frequency mode, the control circuit 4 adjusts durations of the on-periods $T_{ON-TAR}$ such that an input power received at the input of the power converter circuit meets the power consumption of the load Z. Referring to the above, the feedback signal $S_{FB}$ represents the power consumption of the load Z, so that by adjusting durations of the on-periods $T_{ON-TAR}$ dependent on the feedback signal $S_{FB}$ the output voltage $V_{OUT}$ and therefore, the output power can be regulated. Defining a plurality of successive targeted drive cycles by the first control circuit 4 may include generating a targeted drive signal S6, as shown in FIG. 6. The targeted drive signal S6 includes a plurality of drive cycles each including an on-period $T_{ON-TAR}$ and an off-period $T_{OFF-TAR}$. FIG. 8 shows a part of the on-period $T_{ON-TAR}$ and the off-period $T_{OFF-TAR}$ of one drive cycle and the beginning of a next drive cycle. The targeted drive signal S6 has an on-level during the on-periods $T_{ON-TAR}$ and an off-level during the off-periods $T_{OFF-TAR}$. The on-level indicates that it is desired to switch on the first electronic switch 11, and the off-level indicates that it is desired to switch off the first electronic switch 11. Just for the purpose of explanation, the on-level is a high level and the off-level is a low level in the example shown in FIG. 8.

Drive cycles of the drive signal S11 received at the gate node of the first electronic switch 11 are referred to as actual drive cycles in the following. Referring to FIG. 8, the actual drive cycles represented by the drive signal S11 can be (slightly) different from the targeted drive cycles represented by the targeted drive signal S6. If, as schematically illustrated in FIG. 8, a beginning of a targeted drive cycle lies in a time period in which the disable signal $S_{DIS}$ has a disable level (the auxiliary signal $S_{AUX}$ is outside the predefined signal range) the first control circuit 4 delays the beginning of the corresponding actual drive cycle until the disable signal $S_{DIS}$ changes to the enable level. Such delay time is denoted as $T_{DEL-ON}$. When the first electronic switch 11 switches on driven by the actual drive signal S11 the auxiliary signal $S_{AUX}$ falls below the threshold $S_{AUX-TH}$ until the actual drive signal S11 switches off the first electronic switch 11 so that the disable signal $S_{DIS}$ has the enable level until the end of the on-period $T_{ON}$ of the actual drive cycle, wherein the end of the on-period $T_{ON}$ of the actual drive cycle is identical with the end of the on-period $T_{ON-TAR}$ of the targeted drive cycle. Thus, once the first electronic switch 11 has been switched on the disable signal $S_{DIS}$ does not disable the first electronic switch 11 before the end of the on-period defined by the targeted drive signal S6.

Referring to the above, the disable signal $S_{DIS}$ can only delay the beginning of an actual drive cycle relative to the beginning of a targeted drive cycle, whereas the on-period $T_{ON}$ of the actual drive cycle ends at the same time as the on-period $T_{ON-TAR}$ of the targeted drive cycle. Disabling the first electronic switch 11 by the disable signal $S_{DIS}$ dependent on the auxiliary signal $S_{AUX}$ may cause a (slight)

variation of the switching frequency of the actual drive signal S11 as compared to the targeted drive signal S6. However, such variation of the switching frequency is acceptable and less critical than a current shoot through that can occur if the first electronic switch 11 is not disabled in those time periods in which the auxiliary signal $S_{AUX}$ is outside the predefined signal range. Although the disable signal $S_{DIS}$ may cause variations of the switching frequency of the actual drive signal S11 an operation mode in which drive cycles of the targeted drive signal are generated at a fixed frequency is referred to as fixed frequency mode in the following.

The disable signal $S_{DIS}$ disables the first electronic switch in each operation mode. However, in the variable frequency mode (QR) mode, if the first electronic switch 11 is desired to be switched on at the time of a local minimum of the load path voltage $V_{DS}$, this time is outside those time periods in which the disable signal $S_{DIS}$ disables the first electronic switch 11 so that the disable signal $S_{DIS}$ does not affect operation of the power converter circuit in the variable frequency mode.

Figure 9:
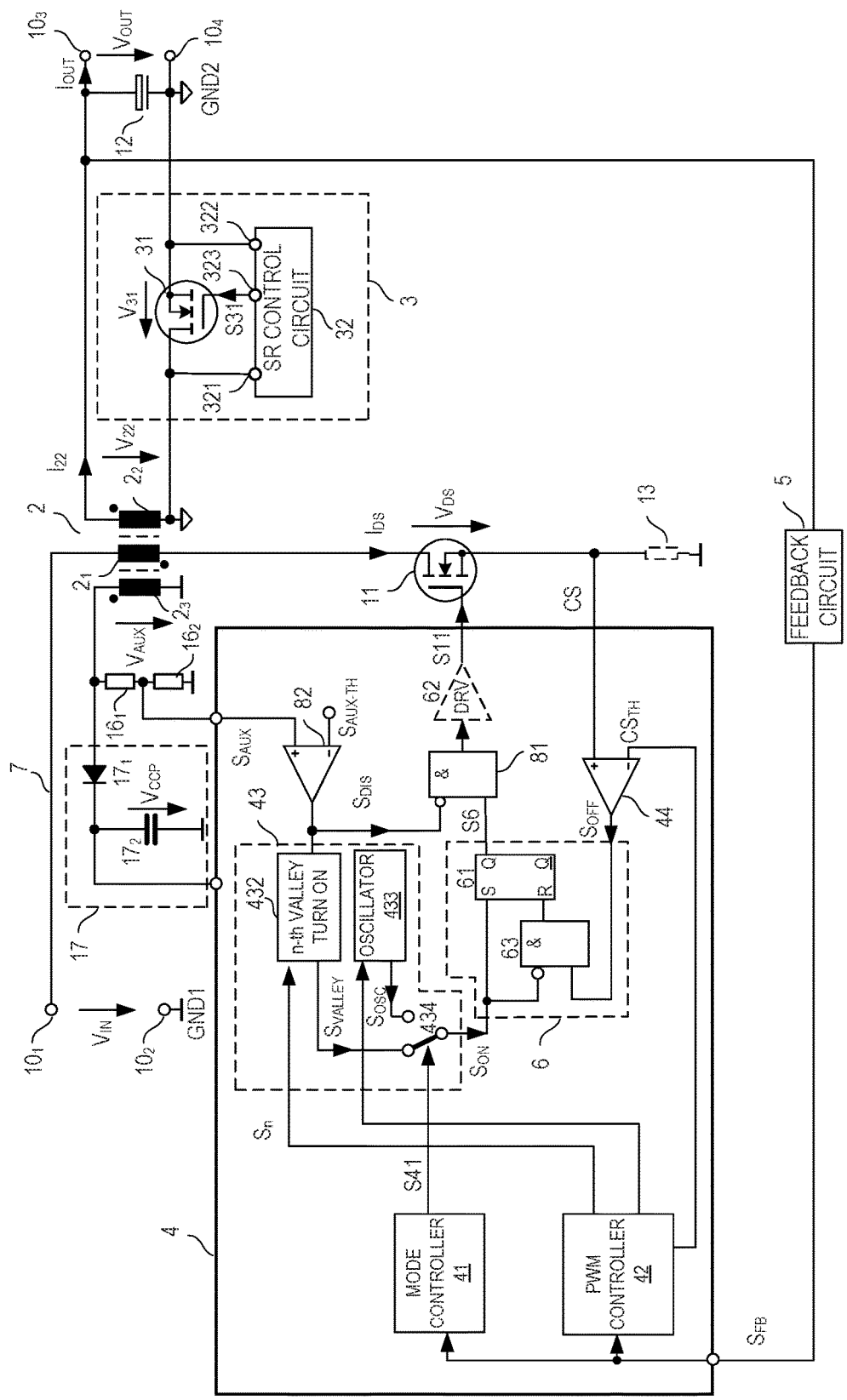
FIG. 9 shows a power converter circuit with a first control circuit according to one example.

FIG. 9 shows one example of a first control circuit 4 that is configured to operate the power converter circuit in accordance with one of the examples explained above. This first control circuit 4 is configured to evaluate the auxiliary voltage across the auxiliary winding $2_3$ and disable the first electronic switch 11 if the auxiliary voltage $V_{AUX}$ is outside a predefined voltage range. FIG. 9 shows a block diagram of the first control circuit 4. It should be noted that this block diagram illustrates the functional blocks of the first control circuit 4 rather than a specific implementation of the first control circuit 4. Those functional blocks can be implemented in various ways. According to one example, these functional blocks are implemented using dedicated circuitry. According to another example, the first control circuit 4 is implemented using hardware and software. For example, the first control circuit 4 includes a microcontroller and software running on the microcontroller.

Figure 10:
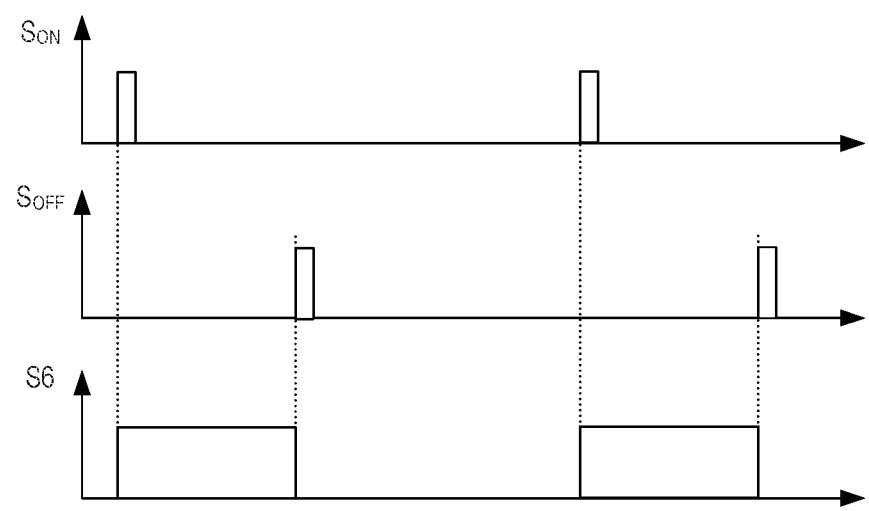
FIG. 10 shows signal diagrams of signals occurring in the first control circuit shown in FIG. 9.

Referring to FIG. 9, the first control circuit 4 includes an output circuit 6 configured to generate the targeted drive signal S6 based on an on-signal $S_{ON}$ and an off-signal $S_{OFF}$. One way of operation of the output circuit 6 is shown in FIG. 10 which illustrates signal diagrams of the on-signal $S_{ON}$, the off-signal $S_{OFF}$ and the first drive signal S11. Referring to FIG. 10, each of the on-signal $S_{ON}$ and the off-signal $S_{OFF}$ includes signal pulses, wherein the output circuit 6 is configured to generate the on-level of the targeted drive signal S6 when a signal pulse of the on-signal $S_{ON}$ occurs, and generate the off-level of the targeted drive signal S6 when a signal pulse of the off-signal $S_{OFF}$ occurs. This functionality can be realized in many different ways. FIG. 9 shows only one example of an output circuit 6 that operates in accordance with the timing diagrams shown in FIG. 9.

In the example shown in FIG. 10, the output circuit 6 includes a flip-flop 61, in particular an SR flip-flop, that receives the on-signal $S_{ON}$ at a set input S and generates the targeted drive signal S6 at a non-inverting output S11. The flip-flop 61 may receive the off-signal $S_{OFF}$ at a reset input. Alternatively, as shown in FIG. 9, the reset input R of the flip-flop receives an output signal of an AND gate 63 that receives the on-signal $S_{ON}$ at an inverting input and the off-signal $S_{OFF}$ at a non-inverting input. This AND gate 63 implements a blanking time in the generation of the first drive signal S11 in that flip-flop 61 cannot be reset by the off-signal $S_{OFF}$ as long as the on-signal $S_{ON}$ has a high-level. Referring to the explanation below, the off-signal $S_{OFF}$ is generated by comparing a current sense signal CS with a reference signal. Shortly after the first electronic switch 11 switches on voltage spikes of the current sense signal may occur, wherein such voltage spikes may result in signal pulses of the off-signal $S_{OFF}$. The AND gate 63 blanks out those signal pulses of the off-signal $S_{OFF}$ and therefore prevents the first drive signal S11 from switching off the first electronic switch 11 due to parasitic voltage spikes that may occur in the current sense signal CS.

The first drive signal S11 is provided at an output of a logic gate 81 that receives the targeted drive signal S6 and a disable signal $S_{DIS}$. Optionally, a driver 62 is connected between the logic gate 8 and the control node (gate node) of the first electronic switch 11. This driver 62 is configured to convert a logic signal output by the logic gate 8 into the first drive signal S11 suitable to drive the first electronic switch. According to one example, the logic gate 81 is an AND gate that receives the disable signal $S_{DIS}$ at an inverting input and the targeted drive signal S6 at a non-inverting input. This AND gate 81, optionally together with the driver 62, generates the first drive signal S11 in accordance with the timing diagrams shown in FIG. 8.

A comparator 82 generates the disable signal $S_{DIS}$ from an auxiliary signal $S_{AUX}$ that proportional to the auxiliary voltage $V_{AUX}$ and a threshold signal representing the predefined threshold $S_{AUX-TH}$ explained with reference to FIG. 8. The threshold $S_{AUX-TH}$, for example, is zero. In example shown in FIG. 9, the comparator 82 receives the auxiliary signal $S_{AUX}$ at a non-inverting input and the threshold signal $S_{AUX-TH}$ at an inverting input so that the comparator 82 generates the disable signal $S_{DIS}$ from the auxiliary signal $S_{AUX}$ and the threshold signal $S_{AUX-TH}$ in accordance with the timing diagrams shown in FIG. 8. As shown in FIG. 9, the auxiliary signal $S_{AUX}$ can be generated by a voltage divider $16_1$, $16_2$ that receives the auxiliary voltage $V_{AUX}$ as an input signal.

Referring to FIG. 9, the first control circuit 4 includes a mode controller 41 that receives the feedback signal $S_{FB}$ and outputs a mode signal S41. The mode controller 41 defines the operation mode of the power converter. That is, the mode controller 41 defines if the power converter operates in a first operation mode or a second operation mode. The mode controller 41 selects the operation mode based on the feedback signal $S_{FB}$. Referring to the above, the feedback signal $S_{FB}$ indicates a power consumption of the load Z (see FIG. 1). According to one example, the mode controller 41 causes the power converter to operate in the first operation mode if the feedback signal $S_{FB}$ is above a predefined threshold, and in the second operation mode if the feedback signal $S_{FB}$ is below the predefined threshold. According to one example, the first operation mode is a fixed frequency mode and the second operation mode is a variable frequency mode such as a QR mode. The mode signal S41 output by the mode controller represents the desired operation mode of the power converter circuit.

An on-circuit 43 generates the on-signal $S_{ON}$. The on-circuit 43 is configured to generate the on-signal $S_{ON}$ based on an oscillator signal $S_{OSC}$ in the fixed frequency mode and based on a valley signal $S_{VALLEY}$ from a valley detection circuit in the variable frequency mode. The valley detection circuit includes the comparator 82 that generates the disable signal $S_{DIS}$ and an evaluation circuit (valley selection circuit) 432. Referring to FIG. 8, the disable signal includes one of a rising edge and a falling edge each time the auxiliary signal $S_{AUX}$ crosses the threshold signal $S_{AUX-TH}$. If the threshold $S_{AUX-TH}$ is zero rising and falling edges of the disable signal $S_{DIS}$ represent zero crossings of the auxiliary voltage $V_{AUX}$ and the auxiliary signal $S_{AUX}$, respectively. In this case, as shown in FIG. 9, one and the same signal, which is the disable signal in FIG. 9, can be used both to disable the first electronic switch 11 and for generating the valley signal $S_{VALLEY}$. If, for example, the threshold used to generate the disable signal $S_{DIS}$ is different from zero, another comparator (not shown) that receives the auxiliary signal $S_{AUX}$ and a signal representing the threshold of zero can be used to generate the signal representing zero crossings of the auxiliary signal $S_{AUX}$ and received by the evaluation circuit 432.

The evaluation circuit 432 based on the disable signal $S_{DIS}$ and a signal $S_n$ received from a PWM controller 42 generates the valley signal $S_{VALLEY}$. The signal $S_n$ received from the PWM controller 42 defines the waiting time, that is, defines at which local minimum after the demagnetization period $T_{DEMAG}$, the first electronic switch 11 is expected to switch on. The evaluation circuit 432 generates a signal pulse of the valley signal $S_{VALLEY}$ at that time at which the local minimum defined by the signal $S_n$ occurs. The evaluation circuit 432 may calculate the positions in time at which minima occur based on positions in time of the zero crossings as represented by the input signal ($S_{DIS}$ in FIG. 9) of the evaluation circuit 432 in the way explained with reference to FIG. 6.

Referring to FIG. 9, an off-circuit that generates the off-signal $S_{OFF}$ includes a further comparator 44 that compares a current signal CS with a current threshold $CS_{TH}$ and outputs the off-signal $S_{OFF}$. The current signal CS represents the load current $I_{DS}$ through the first electronic switch 11. This load current $I_{DS}$ increases substantially linearly when the first electronic switch 11 switches on. When the current signal CS reaches the threshold $CS_{TH}$, the off-signal $S_{OFF}$ has a signal pulse that causes the output stage 6 to switch off the first electronic switch 11. For example, the current signal CS is generated by a sense resistor 13 connected in series with the first electronic switch 11. By sensing the load current $I_{DS}$, the first control circuit 4 operates the power converter circuit in a current mode. This, however, is only an example. According to another example (not shown) the comparator 44 receives a ramp signal generated by a ramp generator such that the ramp signal increases each time the first electronic switch 11 switches on.

The current threshold $CS_{TH}$ is generated by the PWM controller 42 based on the feedback signal $S_{FB}$ such that the current threshold $CS_{TH}$ increases as the power consumption of the load indicated by the feedback signal $S_{FB}$ increases. An increase of the current threshold $CS_{TH}$ increases the on-period $T_{ON}$ and, therefore, increases the power consumption (input power) of the power converter circuit, so as to regulate the output voltage $V_{OUT}$. The input power of the power converter circuit is given by the input voltage $V_{IN}$ multiplied with the average load current $I_{DS}$. According to one example, the PWM controller 42 is further configured to limit the current $I_{DS}$ through the first electronic switch 11 by preventing the current threshold $CS_{TH}$ to rise above a predefined maximum value. That is, the current threshold $CS_{TH}$ does not rise above the maximum value even if the power consumption of the load Z would require such increase.

According to one example, the PWM controller 42 is further configured to adjust, based on the feedback signal $S_{FB}$, a frequency of the oscillator 433 generating the oscillator signal $S_{OSC}$ in the on-circuit 43 based on the feedback signal $S_{FB}$. For example, the PWM controller 42 is configured to reduce the frequency of the oscillation signal $S_{OSC}$ if the feedback signal $S_{FB}$ falls below a predefined threshold indicating that a power consumption of the load is low. Nevertheless, an operation mode of the first control circuit 4 in which the duration of drive cycles of the targeted drive signal S6 is defined by the oscillator id referred to as fixed frequency mode in the following.

In the first control circuit 4 shown in FIG. 9, selecting the first operation mode or the second operation mode includes selecting the valley signal $S_{VALLEY}$ or the oscillator signal $S_{OSC}$ as the on-signal $S_{ON}$. In FIG. 9, this is illustrated by having a crossover switch 434 connected between the evaluation circuit 432, the oscillator 433 and the output circuit 6, and controlled by the mode signal S41. In the first operation mode (for example, the fixed frequency mode) the mode signal S41 drives the switch 434 such that it outputs the oscillation signal $S_{OSC}$ as the on-signal $S_{ON}$ and in the second operation mode (for example, the variable frequency mode) the mode signal S41 drives the switch 434 such that it outputs the valley signal $S_{VALLEY}$ as the on-signal $S_{ON}$.

Referring to FIG. 9, the first auxiliary voltage $V_{AUX}$ may not only be used to detect local minima of the load path voltage $V_{DS}$, but also to supply the first control circuit 4. For this, a rectifier circuit with a rectifier element $17_1$, such as a diode, and a capacitor $17_2$ are connected to the first auxiliary winding $2_3$. A supply voltage $V_{CCP}$ across is available across the capacitor $17_2$ and received by the first control circuit 4 at a supply input.

The first control circuit 4 shown in FIG. 9 can be implemented based on a first control circuit of a power converter configured to operate in a fixed frequency mode and a variable frequency mode, whereas only one additional element, namely logic element 81 is needed to implement a functionality that safely prevents a current shoot through.

Although various exemplary examples of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

Spatially relative terms such as "under," "below," "lower," "over," "upper" and the like, are used for ease of description to explain the positioning of one element relative to a second element. These terms are intended to encompass different orientations of the device in addition to different orientations than those depicted in the figures. Further, terms such as "first," "second" and the like, are also used to describe various elements, regions, sections, etc. and are also not intended to be limiting. Like terms refer to like elements throughout the description.

As used herein, the terms "having," "containing," "including," "comprising" and the like are open ended terms that indicate the presence of stated elements or features, but do not preclude additional elements or features. The articles "a," "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A power converter circuit comprising:
a transformer comprising a primary winding, a secondary winding, and an auxiliary winding;
a first electronic switch connected in series with the primary winding;
a rectifier circuit connected between the secondary winding and an output, wherein the rectifier circuit comprises a second electronic switch; and
a first control circuit, wherein the first control circuit is configured to
define a plurality of targeted drive cycles each including a targeted on-period and a targeted off-period,
evaluate an auxiliary voltage across the auxiliary winding during a waiting time after the transformer has been demagnetized in one actual drive cycle and before the first electronic switch switches on in a next actual drive cycle, and
generate a drive signal based on the plurality of targeted drive cycles and the auxiliary voltage such that the drive signal switches off the first electronic switch during the targeted off-periods and switches off the first electronic switch during targeted on-periods if the auxiliary voltage, during the waiting time, is outside a predefined voltage range.

2. The power converter circuit of claim 1,
wherein the power converter circuit further comprises a feedback circuit coupled to the output and configured to generate a feedback signal based on an output signal available at the output, and
wherein the first control circuit is further configured to operate the power converter circuit in one of a first operation mode and a second operation mode based on the feedback signal.

3. The power converter circuit of claim 2, wherein the first operation mode is a fixed frequency mode and the second operation mode is a variable frequency mode.

4. The power converter circuit of claim 3, wherein the first control circuit is configured,
in the fixed frequency mode, to define a frequency at which the targeted drive cycles occur based on an oscillation signal provided by an oscillator,
in the variable frequency mode, to define a frequency at which the targeted drive cycles occur based on the feedback signal and the auxiliary voltage.

5. The power converter circuit of claim 4, wherein in the variable frequency mode the first control circuit is configured in the off-period of the first electronic switch to detect threshold crossings when the auxiliary voltage crosses a predefined threshold, select one of these times based on the feedback signal, and start an on-period of a targeted drive cycle based on the selected time.

6. The power converter circuit of claim 5, wherein the first control circuit is configured to start the on-period of the targeted drive cycle based on the selected time and based on a time period between two successive threshold crossings.

7. The power converter circuit of claim 5, wherein the first control circuit is configured to
detect local minima of a voltage across the first electronic switch, select one of the local minima based on the feedback signal, and start an on-period of a targeted drive cycle at a time of the selected local minimum,
wherein detecting local minima of the voltage across the first electronic switch comprises detecting local extrema of the auxiliary voltage.

8. The power converter circuit of claim 1, wherein the first control circuit is further configured to
generate a disable signal based on the auxiliary voltage across the auxiliary winding,
generate a targeted drive signal that represents the plurality of targeted drive cycles, and
generate the drive signal based on the disable signal and the targeted drive signal.

9. The power converter circuit of claim 1, wherein the rectifier circuit further comprises a second control circuit configured to control the second electronic switch based on a voltage across the second electronic switch.

10. The power converter circuit of claim 9, wherein the second control circuit is configured to
switch on the second electronic switch when the voltage across the second electronic switch has a first polarity and the absolute value of the voltage rises above a first threshold, and
switch off the second electronic switch when the voltage across the second electronic switch has a first polarity and the absolute value of the voltage falls below a second threshold lower than the first threshold.

11. The power converter circuit of claim 9, wherein the rectifier circuit further comprises an auxiliary power supply configured to supply power to the second control circuit,
wherein the auxiliary power supply comprises an auxiliary winding of the transformer.

12. The power converter circuit of claim 1, wherein the primary winding and the secondary winding have opposite winding senses.

13. The power converter circuit of claim 12, wherein the primary winding and the auxiliary winding have opposite winding senses.

14. The power converter circuit of claim 1, wherein the auxiliary voltage being outside the predefined voltage range comprises the auxiliary voltage being higher than a predefined threshold, and
wherein the predefined threshold is lower than the auxiliary voltage during a demagnetization period after switching off the first electronic switch and before the waiting time.

15. A method comprising:
defining a plurality of targeted drive cycles each including a targeted on-period and a targeted off-period,
evaluating an auxiliary voltage across an auxiliary winding of a transformer during a waiting time after the transformer has been demagnetized in one actual drive cycle and before a first electronic switch switches on in a next actual drive cycle,
generating a drive signal based on the plurality of targeted drive cycles and the auxiliary voltage such that the drive signal switches off the first electronic switch connected in series with a primary winding of the transformer in a power converter circuit during the targeted off-periods and switches off the first electronic switch during targeted on-periods if the auxiliary voltage across the auxiliary winding of the transformer is outside a predefined voltage range,
wherein the power converter circuit further comprises:
a secondary winding of the transformer, and
a rectifier circuit connected between the secondary winding and an output, wherein the rectifier circuit comprises a second electronic switch.

16. The method of claim 15, further comprising:
generating a feedback signal based on an output signal available at the output, and
operating the power converter circuit in one of a first operation mode and a second operation mode based on the feedback signal.

17. The method of claim 16, wherein the first operation mode is a fixed frequency mode and the second operation mode is a variable frequency mode.

18. The method of claim 17,
wherein operating the power converter circuit in the fixed frequency mode comprises defining a frequency at which the targeted drive cycles occur based on an oscillation signal provided by an oscillator, and
wherein operating the power converter circuit in the variable frequency mode comprises defining a frequency at which the targeted drive cycles occur based on the feedback signal and the auxiliary voltage.

19. The method of claim 18, wherein operating the power converter circuit in the variable frequency mode comprises, detecting threshold crossings when the auxiliary voltage crosses a predefined threshold in the off-period of the first electronic switch, selecting one of these times based on the feedback signal, and starting an on-period of a targeted drive cycle based on the selected time.

20. The method of claim 19, further comprising:
starting the on-period of the targeted drive cycle based on the selected time and based on a time period between two successive threshold crossings.

21. The method of claim 19, further comprising:
detecting local minima of the voltage across the first electronic switch, selecting one of the local minima based on the feedback signal, and starting an on-period of a targeted drive cycle at a time of the selected minimum,
wherein detecting local minima of the voltage across the first electronic switch comprises detecting local extrema of the auxiliary voltage.

22. The method of claim 15, further comprising:
generating a disable signal based on the voltage across the auxiliary winding,
generating a targeted drive signal that represents the plurality of targeted drive cycles, and
generating the drive signal based on the disable signal and the targeted drive signal.

23. The method of claim 15, further comprising:
controlling the second electronic switch based on a voltage across the second electronic switch.

24. The method of claim 23, wherein controlling the second electronic switch comprises:
switching on the second electronic switch when the voltage across the second electronic switch has a first polarity and the absolute value of the voltage rises above a first threshold, and
switching off the second electronic switch when the voltage across the second electronic switch has a first polarity and the absolute value of the voltage falls below a second threshold lower than the first threshold.

25. The method of claim 15, wherein the rectifier circuit further comprises an auxiliary power supply configured to supply power to a second control circuit,
wherein the auxiliary power supply comprises an auxiliary winding of the transformer.

26. The method of claim 15, wherein the primary winding and the secondary winding have opposite winding senses.

27. The method of claim 26, wherein the primary winding and the auxiliary winding have opposite winding senses.

28. The method of claim 15, wherein the auxiliary voltage being outside the predefined voltage range comprises the auxiliary voltage being higher than a predefined threshold, and
wherein the predefined threshold is lower than the auxiliary voltage during a demagnetization period after switching off the first electronic switch and before the waiting time.

* * * * *